United States Patent [19]

Nogami

[11] Patent Number: 4,808,146
[45] Date of Patent: Feb. 28, 1989

[54] PAD NON-ROTATION MECHANISM OF STEERING WHEEL

[75] Inventor: Masateru Nogami, Tokyo, Japan

[73] Assignee: S.T.N. Corporation, Tokyo, Japan

[21] Appl. No.: 141,091

[22] Filed: Jan. 5, 1988

[30] Foreign Application Priority Data

Jul. 22, 1987 [JP] Japan ................ 62-111301

[51] Int. Cl.$^4$ .................. F16H 7/02; B62D 1/10
[52] U.S. Cl. .......................... 474/101; 74/492
[58] Field of Search .............. 474/101, 140, 111; 74/492; 200/61.54, 61.55, 61.56, 61.57

[56] References Cited

U.S. PATENT DOCUMENTS 4,598,603  7/1986  Hiramitsu et al. ............. 200/61.54 X

FOREIGN PATENT DOCUMENTS 0048206  6/1982  Japan .................... 74/492
59-60053  4/1984  Japan .
61-51250  4/1986  Japan .

*Primary Examiner*—Thuy M. Bui
*Attorney, Agent, or Firm*—Browdy & Neimark

[57] ABSTRACT

This invention relates to a mechanism for generating a non-rotation state of a non-rotation portion irrespective of the revolution of a steering wheel by disposing the non-rotation portion at the center of the steering wheel. The operation of the mechanism is accurate and correct and the mechanism is compact structurally. The invention employs an endless timing belt or belts to achieve the function described above.

1 Claim, 3 Drawing Sheets

PAD NON-ROTATION MECHANISM OF STEERING WHEEL

BACKGROUND OF THE INVENTION

1. Field of the Invention

Various switches other than a horn switch are now fitted to a steering wheel with the progress in car electronics for motor cars. For instance, the switches for a speed controller, audio equipment, and the like, can be operated more easily and more safely if they can be fitted to the center portion of the steering wheel which is kept stationary independently of the revolution of the steering wheel.

When the switches are disposed at the center portion of the steering wheel, the present invention pertains to an improvement in, or relating to, a mechanism which keeps the switches under a nonrotary state at predetermined positions, though the steering switch can of course rotate when operated.

2. Description of the Prior Art

Japanese Utility Model Laid-Open No. 60053/1984 discloses a handle-top base fixing device which can keep always stationary a switch base disposed on the front surface of a steering wheel relative to a car body irrespective of the revolution of a handle. This device includes a first sun pulley fitted to the reverse surface of a switch base, a second sun pulley fitted to a fixing member such as a column in such a manner as to face the first sun pulley, first and second planetary pulleys disposed coaxially with each other on the front and reverse surfaces of handle spokes inserted between the first and second sun pulleys and timing belt streched between the first sun pulley and the first planetary pulley and between the second sun pulley and the second planetary pulley, respectively.

Since the switch base fixing device described above needs two sun pulleys, two planetary pulleys and timing belts streched between these sun and planetary pulleys, the device becomes unavoidably complicated in structure and its thickness becomes inevitably great.

In order to improve the mechanism described above, Japanese Utility Model Laid-Open No. 51250/1986 discloses a mechanism including an upper large pulley fitted to the reverse surface of a steering pad, a lower large pulley fitted to a fixing member such as a column in such a manner as to face the upper large pulley, a hub plate of a steering wheel interposed between these upper and lower large pulleys, small guide pulleys fitted to the front and reverse surfaces of the hub plate and a wire wound several turns on the upper and lower large pulleys and having both end portions thereof connected through the small pulleys. In this structure, too, the thickness of the mechanism becomes great because of the upper and lower large pulleys and the small guide pulleys.

SUMMARY OF THE INVENTION

To eliminate the problems of the prior art technique described above, the present invention contemplates to provide a mechanism which generates reliably a non-rotation state of a non-rotation portion, which is disposed at the center of a steering wheel, irrespective of the revolution of the steering wheel, which can operate smoothly and which is more compact structurally than the prior art devices.

In accordance with the present invention, a pair of external gears having pad fitting portions at the upper and lower parts thereof are fitted rotatably in such a manner as to interpose therebetween a boss disposed at the center of arms of a steering wheel, timing belts meshing with the pair of external gears are fitted between rings that are fitted to the spacers which are in turn integral with the arms, and a pad can thus be kept stationary irrespective of the revolution of the steering wheel.

DESCRIPTION OF THE PREFERRED EMBODIMENT

Figure 1:
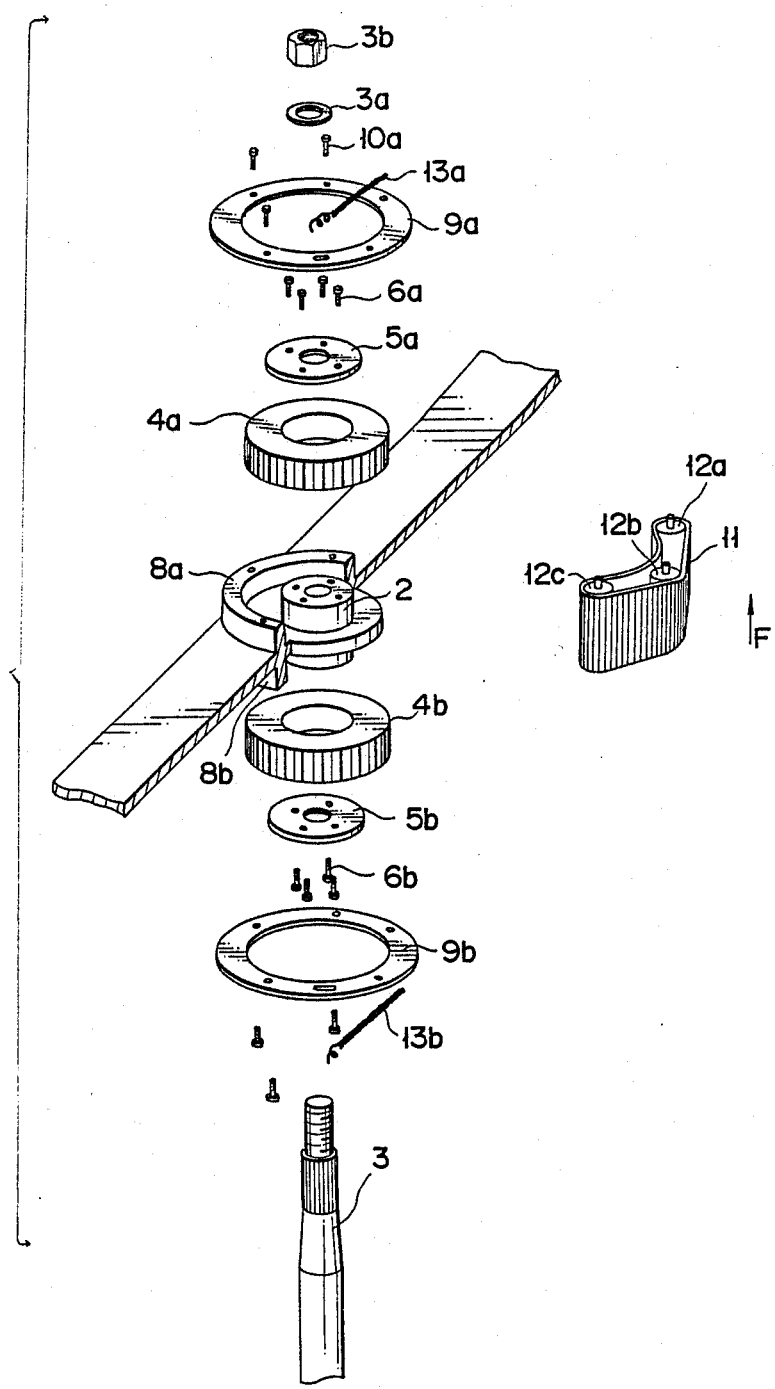
FIG. 1 is an exploded view of a pad non-rotation mechanism.

In the drawings, reference numeral 1 represents an arm of a steering wheel and reference numeral 2 does a boss. The top of a steering rod 3 is inserted into the boss 2 and fixed thereto through a washer 3a and a nut 3b. When the steering wheel is operated, rotation is transmitted through the steering rod 3. Reference numerals 4a and 4b represent external gears on the pad side and a pad fitting portion is disposed either integrally or separately on these gears. The gears are fitted to the upper and lower portions of the boss 2 and fixed thereto by fixing plates 5a, 5b from above and below by screws 6a, 6b, respectively, to prevent fall-off of the gears from the boss 2.

Reference numerals 8a and 8b represent spacers which are concentric with the boss 2 and have notches formed by cutting off their integral part, respectively. Rings 9a and 9b are fitted to the spacers 8a, 8b by screws 10a. Therefore, the external gears 4a, 4b are fitted idly to the boss 2 in such a manner as to be capable of rotation between the boss 2 and the respective spacers 8a, 8b.

Reference numeral 11 represents an endless timing belt, which is spread endlessly on tension rollers 12a, 12b, 12c which are pivotally supported by the lower and upper spacers 8b, 8a fitted on the side of the boss 2. The endless timing belt meshes with the upper and lower external gears 4a, 4b. Therefore, when the arm 1 rotates, the endless timing belt 11 rotates, too, round the boss 2 at the same angle through the spacers 8a, 8b which are integral with the arm 1. However, since the upper and lower external gears 4a, 4b meshing with the endless timing belt 11 are free, they rotate in the opposite direction, cancells exactly the rotation of the steering wheel and keeps a stationary state. Reference numerals 13a and 13b represent tension springs which are fitted to the shaft end portion of the tension roller 12a or 12b and on the side of the arm 1 so that predetermined tension is always applied to the endless timing belt 11 and the endless timing belt can correctly mesh with the external gears.

Figure 2:
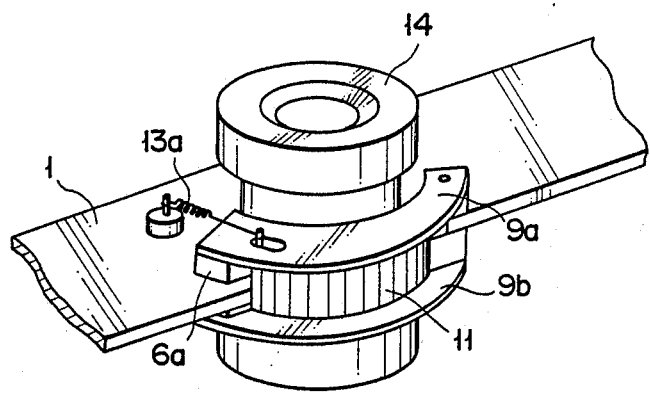
FIG. 2 is a perspective view of the principal portions of the pad non-rotation mechanism.
Figure 3:
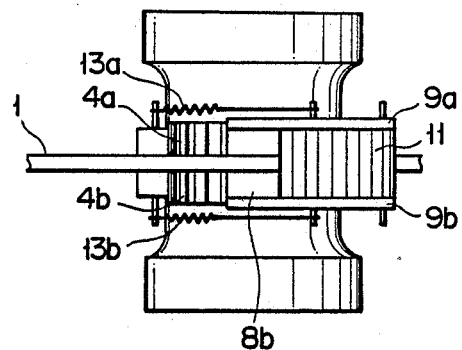
FIG. 3 is a side view of the pad non-rotation mechanism.

FIGS. 2 and 3 are perspective views showing one embodiment of the steering wheel having the mechanism of the present invention shown in FIG. 1. Reference numeral 14 represents a pad fitting portion, which is integral with the external gear 4a shown in FIG. 1. A pad equipped with various switches is mounted onto this pad fitting portion. Incidentally, the spacers 8a', 8b' shown in the drawings are not arcuate but rectangular. The arcuate rings 9a' 9b' are fixed between these rectangular spacers 8a', 8a' and the endless timing belt 11 is disposed between them.

Figure 4A:
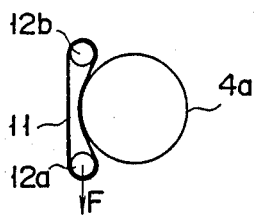
FIG. 4a–4e show various methods of fitting an endless timing belt.

FIGS. 4(a) to 4(e) show modified examples of methods of putting the endless timing belt 11 to the external gear 4a (or 4b). In FIG. 4(a), tension F is applied unidirectionally by the tension spring 13a in the same way as in the embodiment shown in FIG. 2. Quite naturally, the position of the roller 12b at the other end is fixed.

Figure 4B:
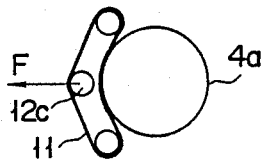

In FIG. 4(b), only one endless timing belt 11 is employed and tension F corresponding to the timing belt is allowed to act on the tension roller 12c at the center.

Figure 4C:
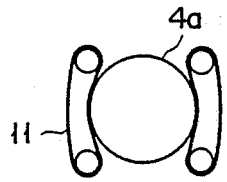
Figure 4D:
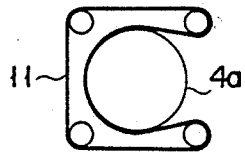
Figure 4E:
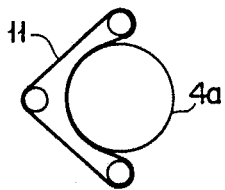

In FIG. 4(c), a pair of endless timing belts are disposed symmetrically with each other while in FIG. 4(d), the endless timing belt is disposed in a C-shape. In FIG. 4(e), the timing belt is arranged in such a manner as to mesh with about one half of the external gear.

When the steering wheel is rotated, the endless timing belt, too, moves around at the same angle. Then, the external gear that meshes with the endless timing belt moves around the boss in the opposite direction, thereby keeping the stationary state. Accordingly, the pad which is mounted onto the external gear does not rotate at all so that the switches on the pad can be operated correctly and safely.

In accordance with the present invention described above, the pad non-rotation mechanism is composed of the external gears fixed on the pad side and fitted idly to the boss and the endless timing belt fitted onto the arm side and meshing with the external gears. Moreover, the external gears are disposed rotatably as a pair on the upper and lower sides of the arm in such a manner as to mesh with the endless timing belt. Accordingly, the pad non-rotation mechanism is compact as a whole.

Since engagement of the gears is only the engagement between the external gears and the endless timing belt, the gear operation can be transmitted smoothly and reliably. Moreover, this engagement can be regulated by the spring.

Since the endless timing belt is fitted between the spacers under tension of the spring, it does not shake completely but can mesh smoothly with the external gears.

Though the invention has thus been described with reference to a preferred embodiment thereof, the invention is not particularly limited thereto but can of course be changed or modified in various manners without departing from the spirit and scope thereof.

What is claimed is:

1. A pad non-rotation mechanism of a steering wheel wherein a pair of external gears having pad fitting portions at the upper and lower portions thereof are disposed rotatably in such a manner as to interpose therebetween a boss disposed at the center of arms of a steering wheel, and an endless timing belt or belts meshing with the pair of said external gears are fitted between rings mounted to spacers which are integral with said arms so that a pad can be kept stationary irrespective of the revolution of said steering wheel.

* * * * *